United States Patent [19]

Gordon

[11] Patent Number: 4,928,632
[45] Date of Patent: May 29, 1990

[54] CAT TOY

[76] Inventor: Richard A. Gordon, 95 W. 3rd St., Freeport, N.Y. 11520

[21] Appl. No.: 243,805

[22] Filed: Sep. 13, 1988

[51] Int. Cl.⁵ .............................................. A01K 29/00
[52] U.S. Cl. ..................................... 119/29.5; 426/132
[58] Field of Search ................ 119/29, 29.5; 426/104, 426/132; D30/160

[56] References Cited

U.S. PATENT DOCUMENTS

| | | | |
|---|---|---|---|
| 1,006,182 | 10/1911 | Cousin | 119/29.5 |
| 2,086,631 | 7/1937 | Munro | 119/29.5 |
| 3,071,476 | 1/1963 | Werft et al. | 426/5 |
| 4,133,296 | 1/1979 | Smith | 119/29.5 |

FOREIGN PATENT DOCUMENTS 2019715  11/1971  Fed. Rep. of Germany ..... 119/29.5

*Primary Examiner*—John Weiss
*Attorney, Agent, or Firm*—Bauer & Schaffer

[57] ABSTRACT

The animal toy and a process for making the same is disclosed. The toy includes a tube of flexible plastic material closed at both ends and having disposed in the interior a material which exhibits a positive attraction to an animal such as catnip to attract a cat. The surface of the tube is provided with a plurality of pores which are normally closed but which open to release a portion of the material from the tube when an animal bites the same thus prolonging the attraction of the animal to the toy.

20 Claims, 2 Drawing Sheets

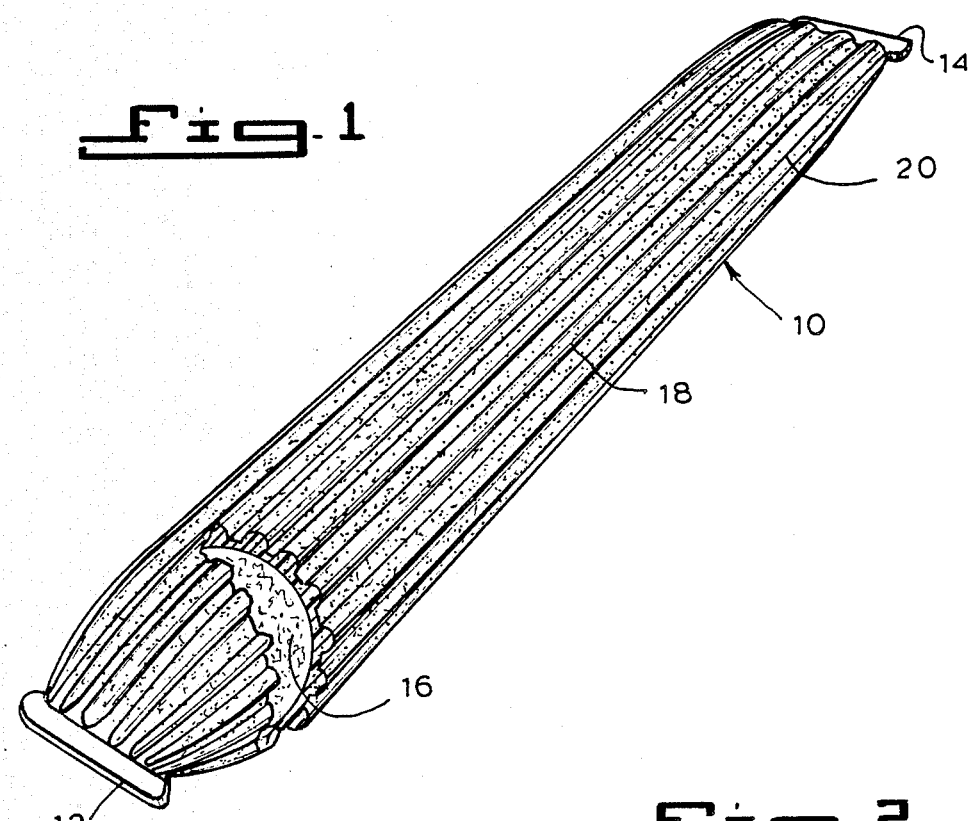
Fig.1
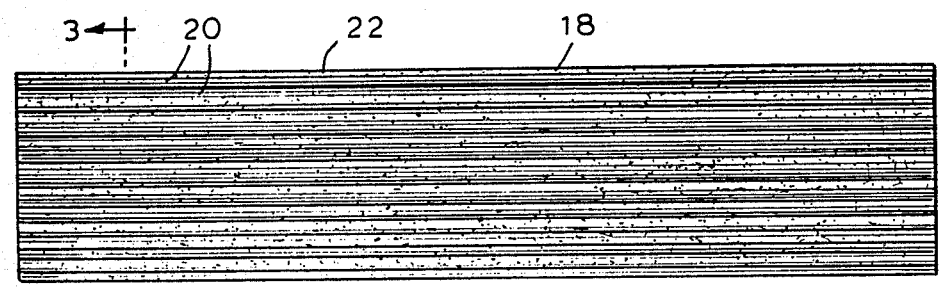
Fig.2
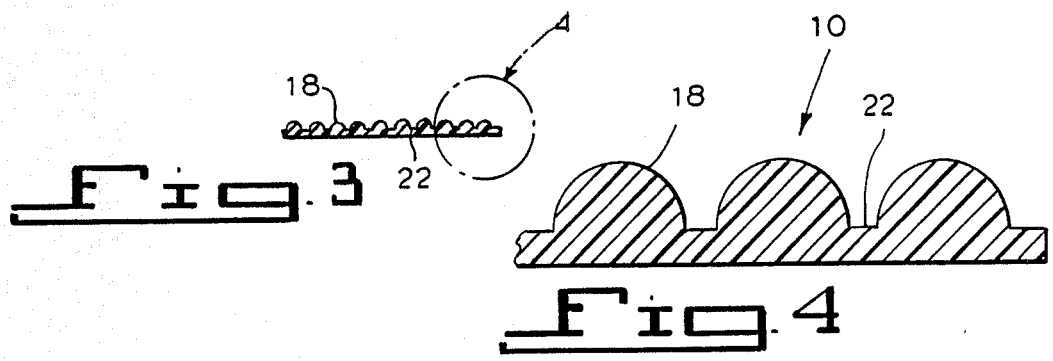
Fig.3
Fig.4

CAT TOY

The present invention relates to an animal plaything and, more particularly, to a toy for a cat.

BACKGROUND OF THE INVENTION

It is well known that while dogs and most other pets generally will enjoy playthings such as balls and other fanciful items, cats do not generally do so. Cats are very attracted to scents, particularly that of an herb commonly known as "catnip" and will therefor seem to play with things that do not seem to be playthings but have such an attraction. The absence of toys for cats severly reduces their exercise needs, particularly in close urban household from which the cat seldom goes out. There exists, therefore, a need for a toy which is attractive to cats and which will make them play with it for extended periods of time within the close confines of small houses and apartments and which cannot be easily destroyed or become foul-smelling or dirty the environment.

The present invention fulfills such a need.

BRIEF STATEMENT OF THE INVENTION

In accordance with the present invention there is provided an animal toy comprising a flexible porous plastic shaped container such as a tube closed at both ends and having disposed in the interior thereof at least one material which exhibits a positive attraction to the animal. The surface of the container is preferably provided with a plurality of pores which are normally sealed but which release a portion of the material from within when the animal bites it. The attraction of the animal to the toy is prolonged due to the material contained therein since the animal is caused to further bite and play with the toy. Preferably, the attraction material is "catnip", for use with cats, and attractants for other animals.

The invention also includes a process for making an animal toy comprising providing a container of a substantially inert, bendible, sealable, malleable, flexible, plastic material forming a plurality of pores in the surface of the container which are normally sealed but which open when the surface of the container is distorted, introducing into the container at least one material which exhibits a positive attraction to an animal, and heat sealing the container closed. In the preferred form, the container is a tube open at both ends, one of which is sealed before filling and the other after filling, by pressing the open ends of tube together and applying heat thereto at a temperature in a range of from about the melting temperature to about the decomposition temperature of the thermoplastic material for a time sufficient to seal the ends of the tube, cooling the sealed ends, and obtaining the animal toy.

In order to understand the invention more fully, reference is directed to the following disclosure and to the accompanying drawings.

BRIEF DESCRIPTION OF THE DRAWINGS IN THE DRAWINGS

FIG. 1 is a view in perspective and partially in section of the animal toy in accordance with the invention;

FIG. 2 is a plan view of a section of tubular strip of thermoplastic material used to make the tube shown in FIG. 1;

FIG. 3 is an end view in section of the strip shown in FIG. 2 taken across line 3—3 of FIG. 2 and illustrating the fluted surface thereof;

FIG. 4 is a partial end view in section of the strip shown in FIG. 3 showing the fluted surface of the strip in detail indicated by the circle in FIG. 3;

DESCRIPTION OF THE PREFERRED EMBODIMENTS

Figure 5:
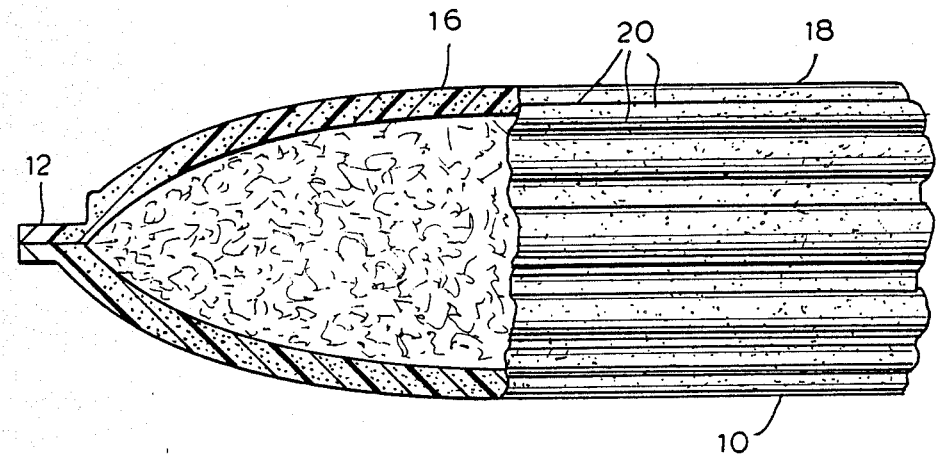
FIG. 5 is a partial view in elevation and partially in section of the animal toy shown in FIG. 1 illustrating in detail a sealed end of the tube.

Referring now to FIG. 1, an animal toy according to the invention is illustrated as a flexible plastic tube 10 which is closed at both ends 12 and 14 by heat-sealing as described in greater detail herein below. Disposed in the interior of the tube 10 is at least one material 16 which exhibits a positive attraction to an animal, such material being introduced into the interior of the tube before the ends are sealed. The surface of tube 10 is provided with a plurality of longitudinal ribs or flutes 18 although the tube can simply be plain or have the flutes running around the circumference of the tube in an encircling disposition. In addition, the tube 10 is provided with a plurality of pores 20 which are normally sealed but which open to release a portion of the material 16 contained within the tube from when an animal bites, bends, or otherwise plays friskily with the toy. Thus, the attraction of the animal to the toy is prolonged since the animal is caused to further bite and/or play with the toy in order to obtain the benefit of the attraction material.

A wide variety of flexible plastic materials can be employed to form the tube used to make the toy of this invention. Suitable plastic materials include non-toxic substantially inert, heat-sealable, malleable, flexible, thermoplastic materials such as polyhexamethylene adipamide (nylon 66), polyester, polyurethane and polyethylene and the like. Nylon 66 and polyethylene are preferred materials.

The material disposed in the tube is a positive sensory attractant to an animal. As used herein, the term sensory attractant is intended to include those materials which excite the olfactory and gustatory nerves and senses as opposed to those which excite the eye or the sense of touch. Such materials may be selected from a wide group of natural teas or herbs such as "catnip" or artificial chemical compositions. The tube is provided with a quantity of this material in flake or powder form. Solid or gel-like fluids which resemble food in odor may be used to lure the animal. In a preferred form, the inserted material is generally a powder, fine enough so that it can be broken down to pass through the pores 20 when the toy is manipulated or bitten.

The pores 20 in the surface of the tube 10 are preferably present in a random multiplicity, and they are made small enough so that they are normally sealed so that the material or its aroma does not escape but which open to release only a small quantity of the fine, powdery material contained in the tube when it is bitten and chewed by a cat or other animal, thus lending longevity to the toy.

As mentioned above, the tube 10 can be made of any of a wide variety of plastic materials. A thermoplastic resinous material known under the tradename "KYRTON", manufactured by Shell Oil Company and/or Sun Oil Company has been found to be advantageous as it is highly malleable but not easily destroyed by animal bitings. Pores can easily be made of a very small size and will also not rip the material. In practice, the toy is formed from a tubular extrusion cut into desired lengths 22, as shown in FIG. 2, which at the same time is formed with the flutes 18 on its outer surface and needled in any suitable, conventional manner on a mandrel to form the pores 20. On the other hand, the tube 10 can be formed of a flat strip of extruded or molded plastic simultaneously fluted and needled and thereafter shaped into the form of a hollow container such as tube 10. This may be accomplished simply by rolling strip around a heated mandrel and then heat-sealing it along the mating edges to form the tube.

Figure 6:
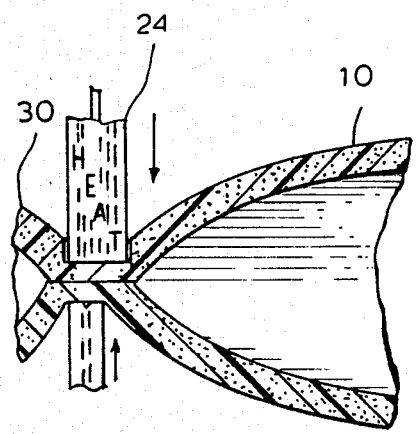
FIG. 6 is a partial view in elevation and in section of a tube used to make the animal toy in accordance with the invention and showing how a tube employed to make a toy according to the invention can be heat-sealed at a point along its length for subsequent cutting and dividing into two or more cylindrical toys.
Figure 7:
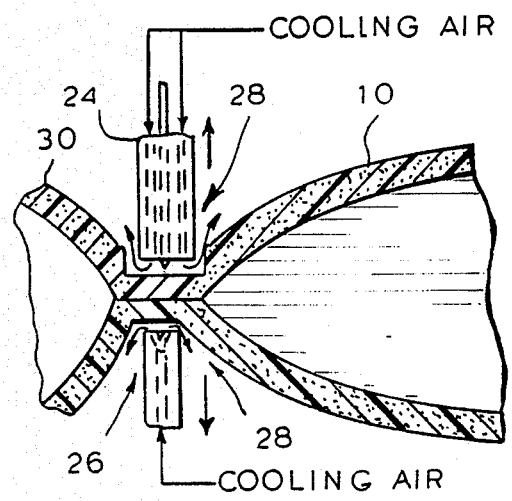
FIG. 7 is a view similar to FIG. 6 showing the introduction of cooling air to the heat-sealed portion of the tube.
Figure 8:
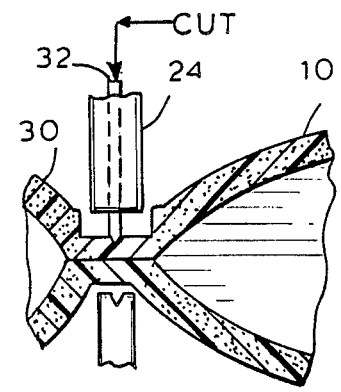
FIG. 8 is a view similar to FIGS. 6 and 7 showing the cutting of the heat-sealed and cooled tube in order to direct the tube into two or more cylindrical toys.

Pre-cut tubular lengths 22 are pinched and closed at one end by a sealing element 24, bearing against the end of the tube while the tube rests on an anvil 26, seen in FIG. 6. The heat is applied to the end of the tube at a temperature in a range of from about the melting temperature to about the decomposition temperature of the thermoplastic material for a time sufficient to seal the ends of the tube. The attractant material, e.g. powdered "catnip" is then introduced through the extruder into the open end of the tube until a given portion of the extrusion is filled. Preferably the container is loosely packet, that is the given amount of fill is less than that to entirely fill the tube so that the tube remains relatively flexible, soft and maliable to the animal. The open end of the filled tube is then closed with the heating element 24, in the same manner as the first end is closed. As seen in FIG. 1, the heat seal formed at each end is made on sides of the plane of the tube, i.e., the first seal is made on top while the second seal is made on the bottom. For certain plastic materials, cooling of the seal is necessary before the heater 26 is withdrawn. Consequently, a stream of cooling air 28 may be directed against the outer surface of the sealed portions of the tube as shown in FIG. 7 until the plastic cures sufficiently to allow the withdrawal of the heater and leave the seal intact. The tube is finished by cutting away any excess 30 using a knife 32 as shown in FIG. 8.

Heat sealing temperatures and its period of application as well as the cooling period will be dependent upon the plastic material employed for the tube. The appropriate temperature range will, of course, be known and available readily from the manufacturer or supplier of the raw plastic material. The advantage of providing oppositely facing seals at each end of the tube lies in the fact that the tube is less likely to twist, flatten, or even curl along its length during storage or during manipulation by the animal then it would be when the seals are made otherwise.

Toys embodying the present invention can be made in many shapes. For example, a hollow container, in the shape of a bone, rather than a simple elongated tube, can be constructed. Ring shaped, or ball shaped toys can also be formed. The shape of the toy illustrated is not intended to limit the invention. Also, the attractant material can be selected to satisfy or entice any particular animal such as a dog, for example.

The animal toy of the invention and the process of making the same present many advantages. Toys can be made by the described process in a simple manner, using readily available materials. The toy can be made in a variety of sizes without greatly altering the materials used and the manipulative steps of the process. In its preferred form, using catnip in powdered form the invention provides a toy which causes a cat to be attracted thereto and play therewith for pronlonged periods of time. Moreover, other advantages of the invention wil be apparent to those skilled in the art.

It is to be understand, therefore, that numerous modifications of this invention can be made without departing from the spirit and scope of the invention, and therefore, the invention is not to be limited to the described embodiments, except as defined in the appended claims.

What is claimed is:

1. An animal toy comprising an elongated tubular container formed of a flexible maleable plastic, said container having disposed in the interior thereof at least one material which exhibits a positive attraction to an animal, the wall of said container being provided with a plurality of random pores which, when said wall is in relaxed condition, are sealed but which open to release a portion of said material from said container when an animal manipulates said container, whereby the attraction of said animal to the top formed by said container is prolonged, and said animal is caused to further bite and play with said toy.

2. The animal toy according to claim 1, wherein said container is shaped to conform to an object normally associated with a given animal.

3. The animal toy according to claim 1 wherein the ends of the container are pinched and heat sealed, the heat seal at one end being made on one surface of said tube, and the other seal at the other end being made on the opposite surface of said tube.

4. The animal toy according to claim 1 wherein the external surface of the container is fluted in a longitudinal direction.

5. The animal toy according to claim 1 wherein the material which exhibits a positive attraction to an animal is a non-toxic material.

6. The animal toy according to claim 1 wherein the material which exhibits a positive attraction to an animal is catnip tea.

7. The animal toy according to claim 1 wherein the material which exhibits a positive attraction to an animal is powdered catnip tea.

8. The animal toy according to claim 1 wherein the material which exhibits a positive attraction to an animal fills the interior of the flexible plastic tube substantially completely.

9. The animal toy according to claim 1 wherein the flexible plastic tube is made of a substantially inert, heat-sealable, malleable, flexible, thermoplastic material.

10. The animal toy according to claim 9 wherein the thermoplastic material is polyhexamethylene adipamide.

11. The animal toy according to claim 9 wherein the thermoplastic material is polyester.

12. The animal toy according to claim 9 wherein the thermoplastic material is polymethane.

13. The animal toy according to claim 8 wherein the thermoplastic material is polyethylene.

14. An animal toy comprising a closed flexible plastic container having disposed in the interior thereof a quantity of powdered sensory attractant, at least one wall of said container being provided with a multiplicity of pores which are normally closed but which open to release a portion of said powdered attractant from said container when the animal bites and manipulates said toy, whereby the attraction of the animal to said toy is prolonged.

15. The process for making an animal toy comprising: providing a container of a substantially inert, heat-sealable, malleable, flexible, thermoplastic material which is open at both ends, forming a plurality of pores in the wall of said container which are normally sealed but which open when the surface of said container is distorted, introducing into said container at least one material which exhibits a positive sensory attraction to an animal, and sealing the open ends of said container together.

16. The process according to claim 15 wherein said container is a tube and the ends are sealed by pressing the ends of said tube together and applying heat thereto at a temperature in a range of from about the melting temperature to about the decomposition temperature of said thermoplastic material for a time sufficient to seal the ends of said tube, cooling said sealed ends, and obtaining said animal toy.

17. The process according to claim 15 wherein the external surface of the container is provided with a plurality of integrally formed flutes extending in a longitudinaly direction.

18. The process according to claim 15 wherein the plurality of pores in the container are formed by puncturing the external surface of said container with needles before introducing the material which exhibits a positive attraction to an animal into said tube.

19. The process according to claim 15 wherein the plurality of pores in the container are formed by puncturing the external surface of said container with needles after introducing the material which exhibits a positive attraction to an animal into said tube.

20. The process according to claim 15 wherein the material which exhibits a positive attraction to an animal is powdered catnip tea.

* * * * *